United States Patent
Alford, Jr. et al.

(10) Patent No.: US 7,027,051 B2
(45) Date of Patent: Apr. 11, 2006

(54) GRAPHICAL USER INTERFACE FOR VISUALIZATION OF SAMPLED DATA COMPARED TO ENTITLED OR REFERENCE LEVELS

(75) Inventors: Jack Allen Alford, Jr., Austin, TX (US); James Bruce Beesley, Georgetown, TX (US); Stephen Raymond Nasypany, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 09/895,236

(22) Filed: Jun. 29, 2001

(65) Prior Publication Data
US 2003/0006988 A1 Jan. 9, 2003

(51) Int. Cl.
*G06T 11/20* (2006.01)
*G09G 5/00* (2006.01)

(52) U.S. Cl. ...................... 345/440; 715/772
(58) Field of Classification Search ............... 345/440, 345/440.2, 772; 709/224, 104, 226; 715/772
See application file for complete search history.

(56) References Cited

U.S. PATENT DOCUMENTS

| | | | | |
|---|---|---|---|---|
| 4,937,743 A * | 6/1990 | Rassman et al. | ................ | 705/8 |
| 5,226,118 A * | 7/1993 | Baker et al. | ................ | 345/833 |
| 5,440,478 A * | 8/1995 | Fisher et al. | ................ | 700/109 |
| 5,483,468 A * | 1/1996 | Chen et al. | ................ | 702/186 |
| 5,541,854 A * | 7/1996 | Yundt | ........................ | 702/19 |
| 5,664,105 A * | 9/1997 | Keisling et al. | ............ | 709/224 |
| 5,684,945 A * | 11/1997 | Chen et al. | ................ | 714/20 |
| 5,715,181 A * | 2/1998 | Horst | ........................ | 702/180 |
| 5,734,591 A * | 3/1998 | Yundt | ........................ | 702/19 |
| 5,751,289 A * | 5/1998 | Myers | ........................ | 345/419 |
| 5,919,248 A * | 7/1999 | Kahkoska et al. | .......... | 709/224 |
| 5,966,139 A * | 10/1999 | Anupam et al. | ............ | 345/440 |
| 6,097,399 A * | 8/2000 | Bhatt et al. | ................ | 345/440 |
| 6,148,335 A * | 11/2000 | Haggard et al. | ............ | 709/224 |
| 6,320,585 B1 * | 11/2001 | Engel et al. | ................ | 345/440 |
| 6,487,604 B1 * | 11/2002 | Rochford et al. | .......... | 709/238 |
| 6,584,400 B1 * | 6/2003 | Beardsworth | ............... | 701/120 |
| 2002/0198985 A1 * | 12/2002 | Fraenkel et al. | ............ | 709/224 |
| 2003/0033040 A1 * | 2/2003 | Billings | ...................... | 700/97 |

* cited by examiner

*Primary Examiner*—Ryan Yang
(74) *Attorney, Agent, or Firm*—Duke W. Yee; Herman Rodriguez; Francis Lammes

(57) ABSTRACT

A method, system and computer program product for displaying resource utilization information for a plurality of resources is provided. A time period is determined in which to measure the resource utilization information. The resource utilization information is monitored based on the time period. A result of the monitoring of the resource utilization information is displayed, wherein the result of the monitoring of the resource utilization information is dynamically displayed so as to provide an indication of utilization of a resource within the plurality of resources relative to a resource reference level.

42 Claims, 8 Drawing Sheets

GRAPHICAL USER INTERFACE FOR VISUALIZATION OF SAMPLED DATA COMPARED TO ENTITLED OR REFERENCE LEVELS

BACKGROUND OF THE INVENTION

1. Technical Field

The present invention relates generally to a method and apparatus for displaying a graphical user interface. Still more particularly, the present invention relates to a method and apparatus for displaying a summary view of sampled data in a graphical user interface used for management, analysis, reporting, and linkage to control devices for activity management compared to expected or entitled or reference levels.

2. Description of Related Art

As a result of the increasing complexity of, for example, data processing systems and communications networks, and with the introduction of multimedia presentations, attempts have been made to simplify the interface between a user and the large amounts of data present within a modern data processing system. One example of an attempt to simplify the interface between a user and a data processing system is the utilization of a so-called graphical user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

One use of GUIs is in the display of resources consumed within, for example, a data processing system. Presently available interfaces will display information to the user about available resources and resources that are being used. The presently available interfaces, however, are cumbersome and often times will use large amounts of the display in the data processing system or multiple pages to visualize a view as compared to expectations. Further, if a user wishes to adjust the allocation of resources, the user often will have to use a different interface or a different control. Often times, these controls will require a user to enter a quantitative input in the form of a number to change an allocation of resources. In addition, prior attempts to display resource allocation and consumption resort to stacking of multiple bars or multiple lines which, in situations with a plurality of monitored tasks and resource combinations, become so complex as to make the display unintelligible.

Therefore, it would be advantageous to have an improved method and apparatus for monitoring and controlling the allocation of resources. A method and apparatus is needed to simplify the presentation of resource behavior compared to allocation/entitlement and add a vital trend analysis feature of displaying both direction and magnitude of resource usage.

SUMMARY OF THE INVENTION

The present invention provides a method, system and computer program product for displaying resource utilization information for a plurality of resources. The value of the invention is the ability to communicate a high-level combined sense of activity level and trend relative to control or expectation reference points. A time period is determined in which to measure the resource utilization information. The resource utilization information is monitored based on the time period. A result of the monitoring of the resource utilization information is displayed, wherein the result of the monitoring of the resource utilization information is dynamically displayed so as to provide an indication of utilization of a resource within the plurality of resources relative to a resource reference level. The present invention also applies to the use of a graphical user interface in static presentations of high level summaries of complex activity reporting.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
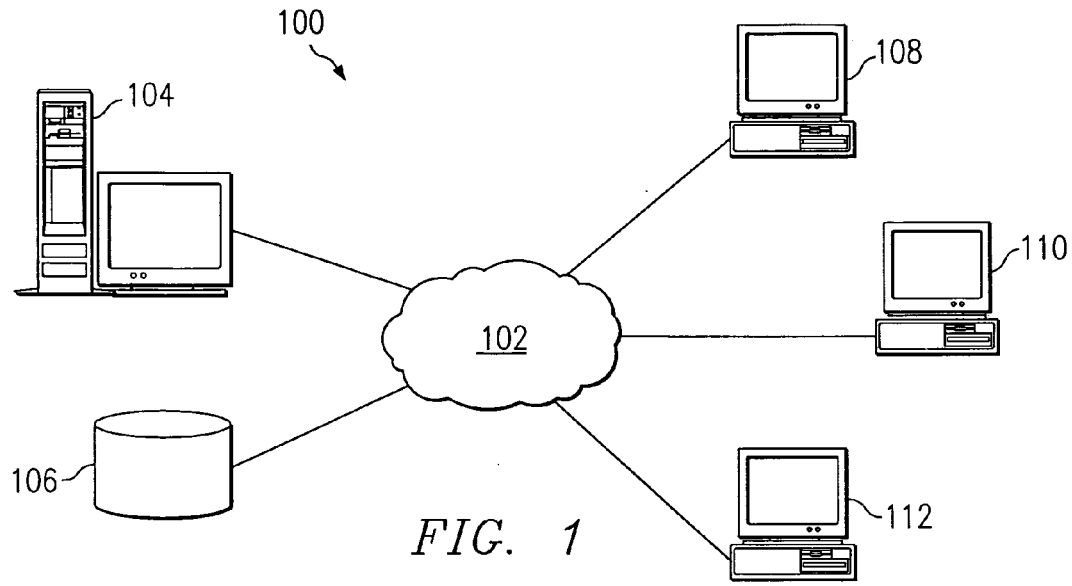
FIG. 1 is a pictorial representation of a networked data processing system in which the present invention may be implemented.

With reference now to the figures, FIG. 1 is a pictorial representation of a networked data processing system in which the present invention may be implemented. Networked data processing system 100 is a network of computers in which the present invention may be implemented. Networked data processing system 100 contains a network 102, which is the medium used to provide communications links between various devices and computers connected together within networked data processing system 100. Network 102 may include wireline connections, such as copper wire or fiber optic cables, and wireless connections, such as cellular telephone connections. Also, the connections for network 102 may be either permanent, such as with a dedicated line, and/or temporary, such as connections made through dial up telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In a multi-tier networked environment, networked applications are provided in which a portion of the application is located on a server, such as server 104 and another portion of the application is located on a client, such as client 108. In this implementation, the client is considered a first tier system while the server is considered a second tier system.

Networked data processing system 100 may include additional servers, clients, and other devices not shown. In the depicted example, networked data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, networked data processing system 100 also may be implemented as an number of different types of networks, such as, for example, an intranet or a local area network.

FIG. 1 is intended as an example, and not as an architectural limitation for the processes of the present invention. For example, network 102 may use other hardware devices, such as, activity counters, volume measuring devices, flow or power meters, plotters, optical scanners, and the like in addition or in place of the hardware depicted in FIG. 1.

Figure 2:
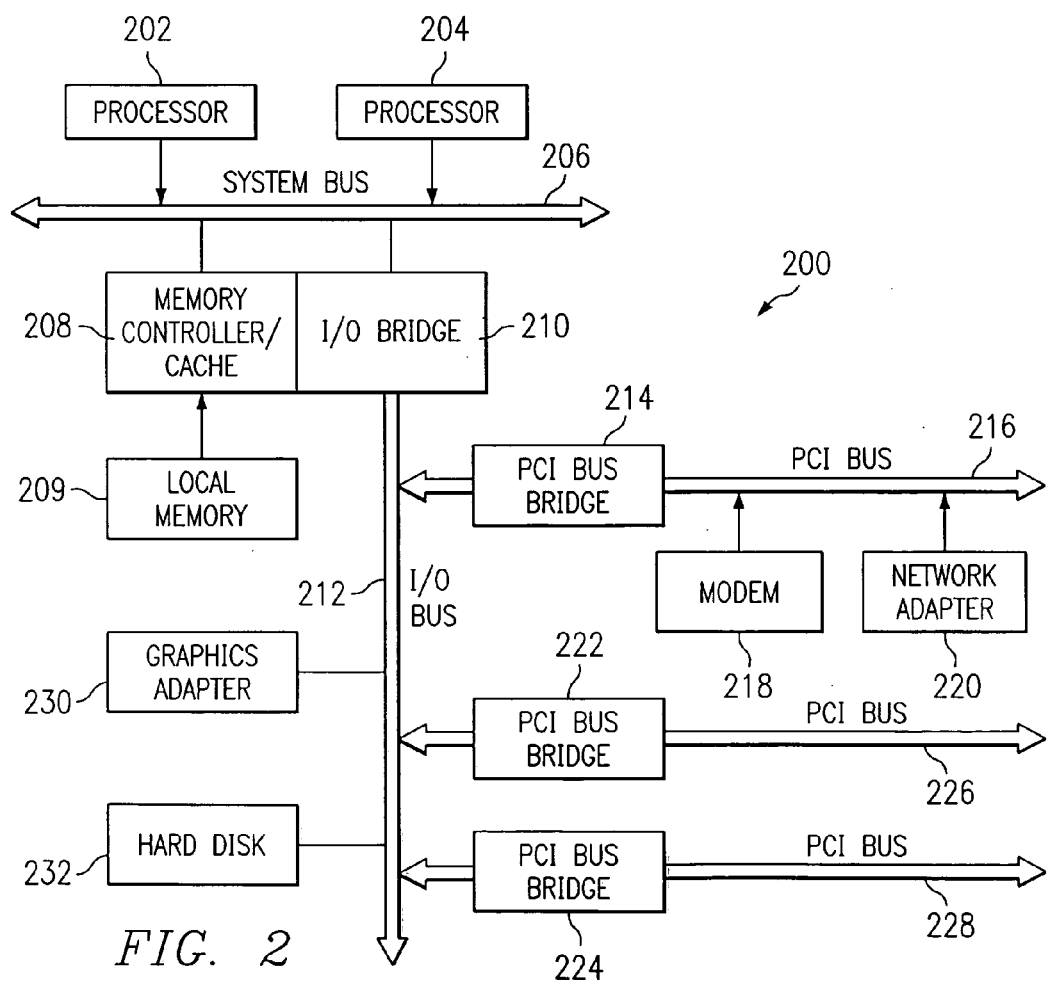
FIG. 2 is a block diagram of a data processing system which may be implemented as a server, in which the present invention may be implemented.

FIG. 2 is a block diagram of a data processing system which may be implemented as a server, in which the present invention may be implemented. FIG. 2 is an example of a server, such as, for example, server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Although the depicted example employs a PCI bus, other bus architectures such as Micro Channel and ISA may be used. A number of modems 218 and 220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM eServer pSeries or RS/6000 system, a product of International Business Machines Corporation in Armonk, N.Y., running the Advanced Interactive Executive (AIX) operating system.

Figure 3:
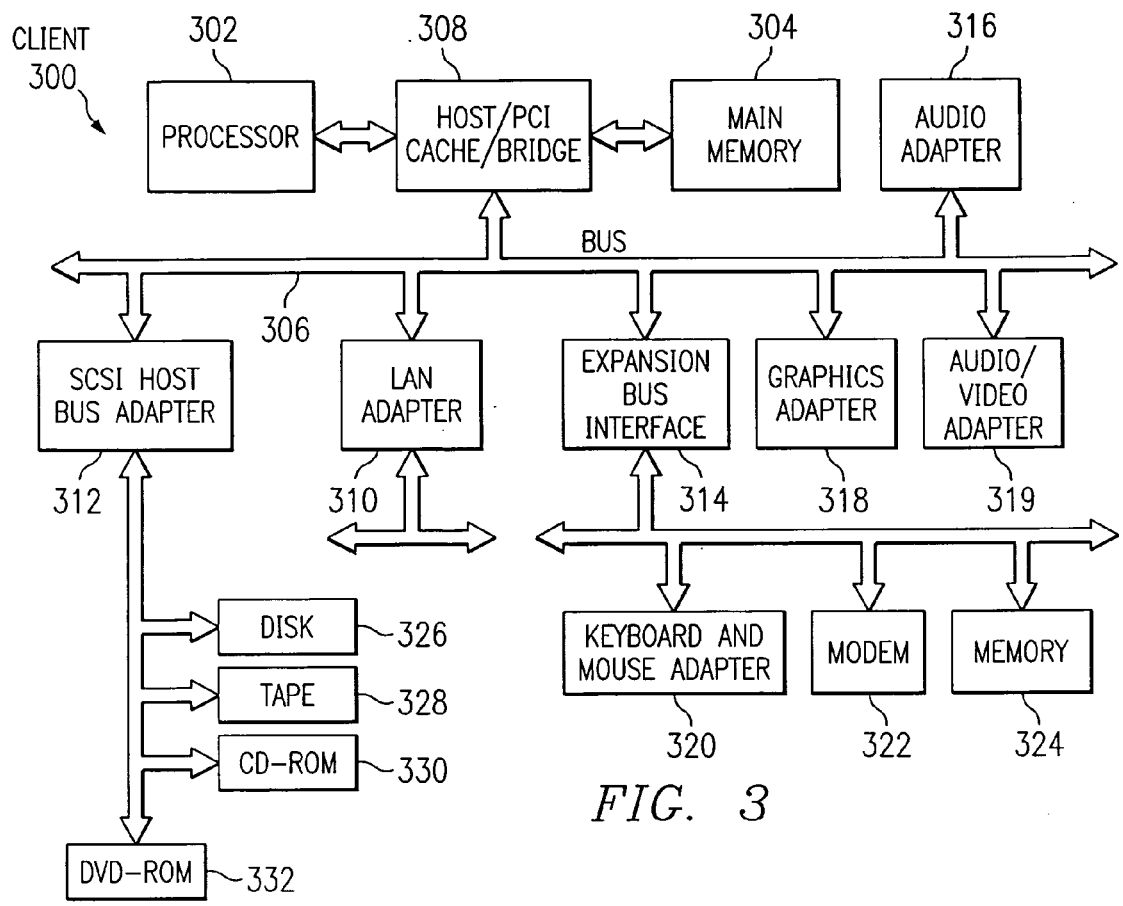
FIG. 3 is a block diagram of a data processing system in which the present invention may be implemented.

FIG. 3 is a block diagram of a data processing system in which the present invention may be implemented. Data processing system 300 is an example of a client computer, such as, for example, clients 108–112 in FIG. 1. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, CD-ROM drive 330, and digital video disc read only memory drive (DVD-ROM) 332 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be an operating system such as Linux or a commercially available operating system such as Windows 2000, which is available from Microsoft Corporation or Solaris which is available from Sun Microsystems Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to a multiprocessor data processing system or any other grouping of resources including but not limited to network bandwidth, manufacturing capacity, fluid flow, power distribution, and the like.

The present invention provides a method, apparatus, and instructions for a control and display system in a graphical user interface to monitor and manage the allocation of a resource into various apportionments on, for example, a target chart and also include the prior actual usage of the resources for comparison. A mechanism is provided for the ability to create different classes of service for jobs and to specify attributes for those classes. These attributes may be, for example, specify minimum and maximum outputs to, for example, a central processing unit (CPU), physical memory and disk input/output (I/O) throughput to be allocated to a class. Jobs may be classified automatically to classes using class assignment rules. These class assignment rules may be based on values of a set of attributes of a process. A user may also manually assign jobs to classes, and thereby, overriding an automatic assignment.

A time period may be determined in which resource utilization information is measured. The resource utilization information may be monitored based on the time period. Then a result of the monitoring of the resource utilization information is displayed. The display of the monitored resource utilization information is dynamically displayed so as to provide an indication of utilization of the resource relative to a resource reference level. A resource reference level is an activity baseline against which sampling data measurement results may be compared. Additionally, an optional resource entitlement level may be used. An optional resource entitlement level is a portion of, for example but not limited to, available computing resources which measured activity is authorized to consume. With this mechanism, the present invention regulates, for example, CPU utilization threads, physical memory consumption, and disk I/O bandwidth used by processes active on the system, and the like.

In particular, in the depicted examples, the display is for a resource in the form of a file system storage space, a central processing unit (CPU) and a memory device on a UNIX based data processing system. However, the display for a resource is not limited to a data processing system or a UNIX based data processing system. Any resource may be monitored and results of a resource utilization may be displayed. Results of the monitoring of resource utilization information may be dynamically displayed in a comprehensive manner so as to provide an indication of utilization of a resource within a plurality of resources relative to an entitlement level. Furthermore, the resources are not limited to a file system storage space, a central processing unit or a memory device and may be used to monitor and control any system or device associated with a data processing system or any other grouping of resources including but not limited to network bandwidth, manufacturing capacity, fluid flow, power distribution, financial market activity, and the like.

A mechanism is available in the present invention for viewing total resource capacity, unallocated resource capacity, allocated resource capacity and historical allocated resource capacity in a single integrated display and control mechanism. By use of a direct manipulation graphical user interface, an administrator may use the present invention to resolve problems from the same interface that is used to report the status of the resources. As a result, the GUI allows an administrator to reduce several steps into a single intuitive operation, greatly improving the ease of the task and reducing errors.

A category of system resources may be for example, a central processing unit, a memory and/or storage disk input/output. An administrative user attribute specifies the name of a user authorized to perform administration tasks of a superclass. An authorized user attribute specifies the user name authorized to manually assign processes to the class. A resource set allows a system administrator to define subsets of system resources.

Different types of views may be provided for monitoring a workload management (WLM) class activity. For example, a tabulation view may list class names and a measured numeric value. The tabulation view may also include columns for a user-defined number of resource shares, minimum share value, maximum share value as well as other settings. A share may be a self adapting percentage. A graph view may also be provided. The graph view may display bars representing absolute usage of a resource over a selected time period. A plurality of time periods may be displayed relative to each other in a table cell.

The snap-shot view may also be provided. The snap-shot view may display a tier and a class name in tabular format. Columns for resources may display deviation from a computed target share. Deviation may be shown in a variety of ways, for example, by color and physical displacement. The snap-shot view may focus on graphically representing a deviation of a class resource consumption from a desired target. This deviation may be derived from user-specified inputs and actual resource utilization. Actual resource consumption values may be collected continuously and recorded. A monitoring application may then read these recordings, compute statistical minimum, maximum, mean and standard deviation for each value, and then compare these results to a desired configuration.

An attribute of the present invention, may be based on, for example, a model-view-controller concept. The model may represent a "data model" containing properties that is needed to determine a state of the software. For example, tier number, class names, resource values, system name and time period may be included. The data model may represent how information is contained in programming logic.

The view is a visual representation of the data model. In one embodiment, there are multiple views based on the same model. When the data model is changed, the view automatically changes based on the changed data model.

The controller may be means by which the data model is manipulated. For example, a selection of classes, resources or times may be displayed. Based on user inputs or external system input, for example, a timer, the values in the data model are changed, which then may trigger a change in the view.

Figure 4:
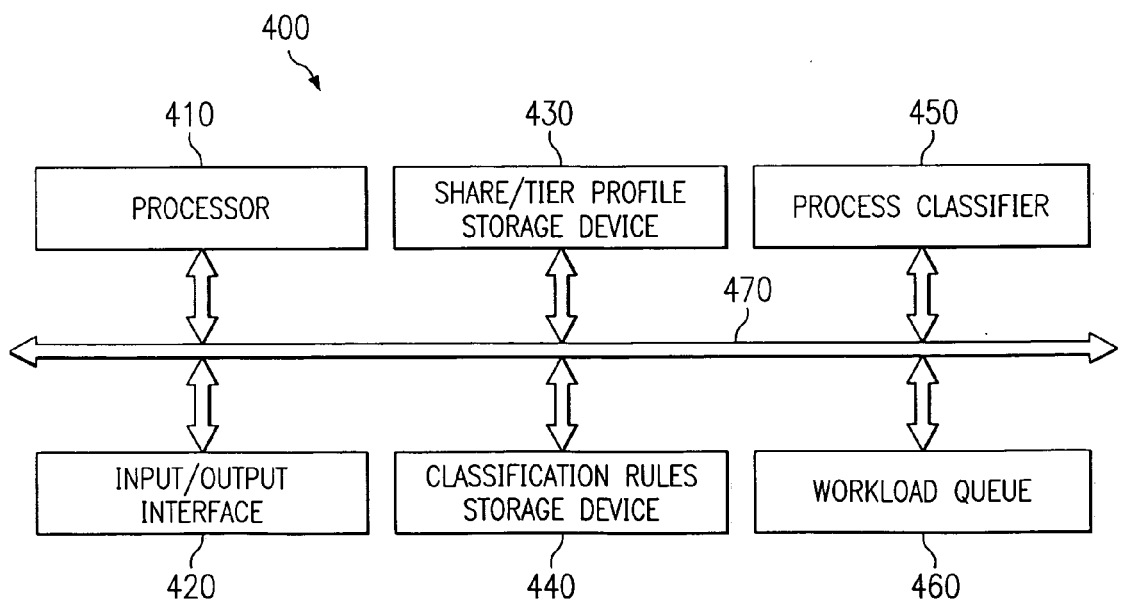
FIG. 4 is an exemplary block diagram illustrating a workload manager in accordance with the present invention.

FIG. 4 is an exemplary block diagram illustrating a workload manager in accordance with the present invention. The workload manager 400 may be implemented in software, hardware, or a combination of software and hardware. For purposes of the following explanation of the preferred embodiments, the present invention will be described in terms of a workload manager 400 implemented in software executed in hardware.

As shown in FIG. 4, the workload manager 400 includes a processor 410, an input/output interface 420, a share/tier profile storage device 430, a classification rules storage device 440, a process classifier 450, and a workload queue 460. The elements 410–460 are in communication with one another via the control/signal bus 470. While a bus architecture is shown in FIG. 4, other mechanisms for providing a communication pathway between the elements 410–460 may be used without departing from the spirit and scope of the present invention.

Processes are received by the workload manager via the input/output interface 420 and are assigned by the process classifier 450 to a class. The classification is performed based on classification rules established and stored in the classification rules storage device 440. Once classified, the processes are stored in the workload queue 460 for processing based on share/tier profile information stored in the storage device 430. The share/tier profile information identifies the shares for a class and the tier to which the class belongs, along with minimum and maximum resource limits, as will be described more fully hereafter. All of these functions are performed under the control of the processor 410.

Process Classification

Each process has associated attributes which may be used to perform a classification of the process into a defined class. For example, a process may include attributes identifying the user that submitted the process, the group from which the process was submitted, the fully qualified path of the application which the process is executing, and the like. These attributes may be used with established classification rules to determine to which class the process should belong.

The classification rules identify which attributes and the values of those attributes that are to be included in a particular class. For example, the classification rules may be as simple as identifying that class 1 comprises all those processes that have a group attribute having the value of "marketing" or "accounting." Similarly, the classification rules may be more complex such as identifying that all processes having a group attribute of "marketing" and that have a user attribute of "brenner" and a fully qualified path of "/bin/analysis" are to be classified in class 2. Based on established classification rules, processes may be classified by determining their attributes and attribute values and applying the classification rules to those attribute values.

Each class has an associated number of system resource shares for each of a plurality of system resources. The default share value for any class is set to 1. However, classes may be assigned system resource shares as integer values ranging, for example, from 1 to 65,535 for each of a plurality of system resources. Thus, for example, a class may have 5 shares for a printer, 6 shares for memory, and 10 shares for CPU time, or the like. Any type of system resource may be represented using the present invention including hardware and software resources.

The shares are used as a relative measure of the importance of the class relative to other classes within the same tier to which the class is assigned. Thus, a first class may have 6 shares of a system resource and a second class may have 10 shares of that system resource. In this example, the second class has a higher relative importance than the first class and thus, will be provided with a higher percentage of that system resource, whether that be CPU time, printer access time, memory space, or the like.

Each class also has defined resource limits. The resource limits indicate the minimum and maximum amount of a system resource that may be allocated to the class as a percentage of the total system resources. Resource limits will be described in more detail hereafter.

In addition to shares, each class is assigned to a particular tier of workload management. For example, the tiers are designated as tiers 0–9, with 0 being the highest priority tier and 9 being the lowest priority tier. Of course, any number of tiers and any manner of identifying tiers may be used without departing from the spirit and scope of the present invention.

With the tier system of the present invention, processes in classes assigned to tier 0 will be favored for access to the system resource over processes in classes in tiers 1–9. By favoring these processes, what is meant is that tier 0 has the first preference in access to system resources (various implementations may grant up to 100% of system resources exclusively assigned to the processes in tier 0 first). Unused or spare system resources are then assigned to the processes in tier 1, and so on. System resources flow down from one tier to another and when resources need to be reclaimed, they are reclaimed in the reverse order. However, alternate designs using the same GUI may be constrained with different relationships and any number of tiers.

Class Assignment Rules

For example, in a UNIX system, for a class to be defined, the class name, tier, resource shares and resource limits must be defined. Once a class has been defined, class assignment rules need to be created. The class assignment rules are used to assign processes to a class based on process attributes.

Figure 5:
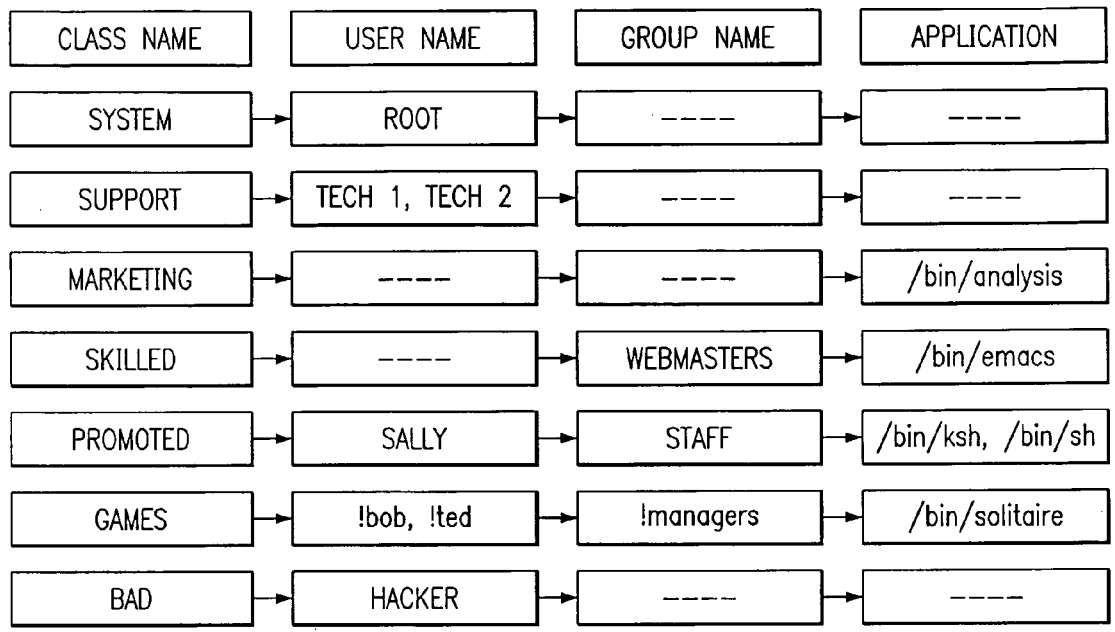
FIG. 5 is an exemplary diagram illustrating classes and class assignment rules.

FIG. 5 is an exemplary diagram illustrating classes and class assignment rules. As shown in FIG. 5, the process attributes utilized in this particular example for classification of processes are user name, group name and application path name.

For example, the class assignment rule for assigning processes into the class "promoted" is that the user name be "sally", the group name be "staff", and the application path be "/bin/ksh" or "/bin/sh." Similarly, for a process to be classified in the "skilled" class, the group name must be "webmasters" and the application path must be "/bin/emacs." Using these class assignment rules, processes are classified into various defined classes.

Figure 6:
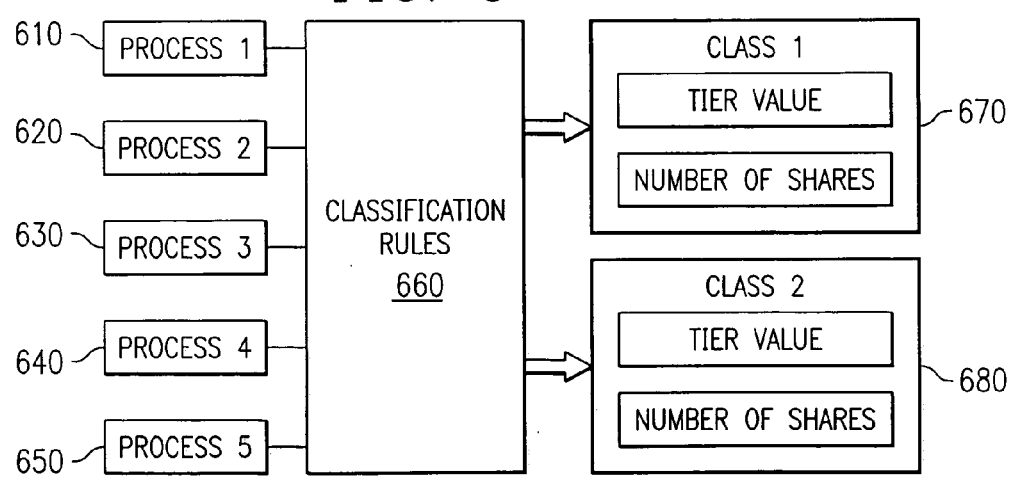
FIG. 6 is an exemplary diagram illustrating an application of classification rules to processes to classify the processes into classes.

FIG. 6 is an exemplary diagram illustrating an application of classification rules to processes to classify the processes into classes. FIG. 6 is an example of a UNIX system. As shown in FIG. 6, classification rules 660 are applied to processes 610–650. Based on the attributes of the processes, e.g., user name, group name, fully qualified path, and the like, these processes meet certain requirements of various ones of the classification rules. As a result, the processes are classified into one of the predefined classes 670 or 680. As a result of the classification, these processes now belong to classes which have an assigned tier value and number of shares which will be used to determine their access to system resources.

Figure 7:
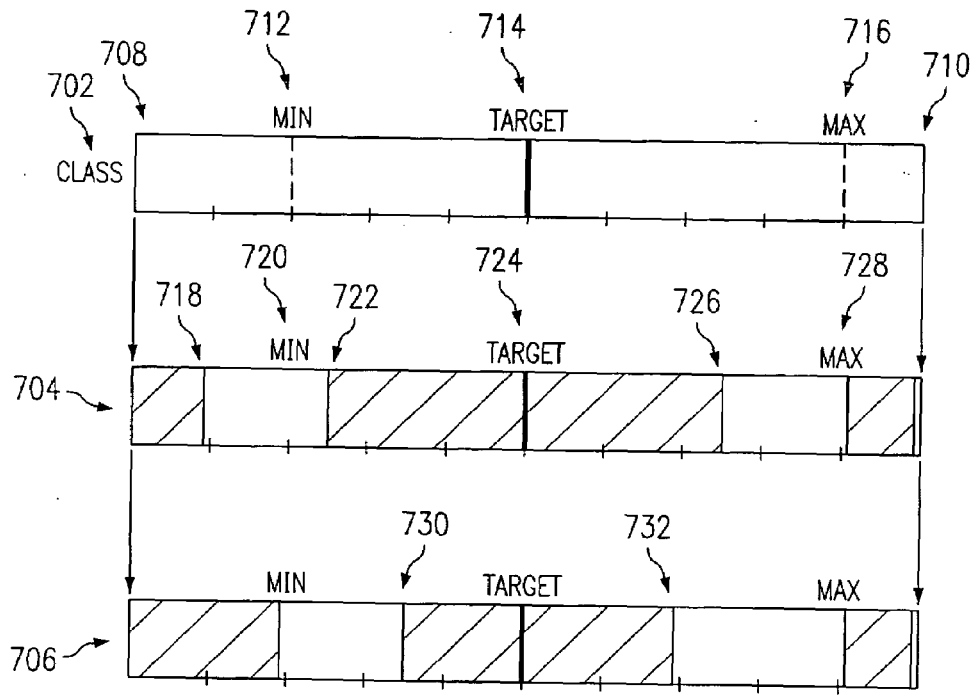
FIG. 7 is an exemplary illustration of snap shot deviation algorithms in accordance with the present invention.

FIG. 7 is an exemplary illustration of snap shot deviation algorithms in accordance with the present invention. FIG. 7 is an example of a UNIX system. A snapshot view focuses on graphically representing, for example, a deviation of a classes resource consumption from a desired target. The snap shot view may be derived from user specified inputs and actual resource utilization of a system. Actual resource consumption values may be collected continuously and recorded. A monitoring application then may read these recordings, compute, for example, a statistical minimum, maximum, mean and statistical deviation on each value and then may compare these results to a desired configuration.

In this example, class graphical representation 702 may be limited to a range in which it may operate on a system. For example, class graphical representation 702 may be limited to operation for a resource on a system between points 708 and 710 which may indicate the total range of the resource on the system. Between points 708 and 710 may be several intermediate criteria, such as for example, minimum criterion 712, target criterion 714 and maximum criterion 716. Target criterion 714 may be the optimum point at which a resource is desired to operate. Minimum criterion 714 may be a boundary in which the resource should not cross during operation, however, if the resource does fall below minimum criterion 712 an indication is given to indicate this operating condition. Likewise, with maximum criterion 716. Maximum criterion may also be a boundary in which the resource should not cross during operation, however, if the resource does rise above maximum criterion 716 an indication is given to indicate this operating condition.

Several points may be defined along class graphical representation 702. For example, points 718–728 may be selected points along class graphical representation 702 which may also represent boundary points in which may indicate the operating status of a resource. For example, as illustrated in resource utilization graphical representation 704, point 718 marks a boundary between no operation of the resource at point 708 and a point somewhere below minimum criteria 712. Likewise, boundaries are located at points 722, 726 and 728 on resource utilization graphical representation 704. If the resource is operating between any one of the ranges between any of these points, an indication may be given indicating the present operating parameters of the resource. While target 724 may be the desired operating condition of the resource, due to demands on the resource and demands on the system as a whole, the resource may spend very little of its operating time at target 724.

The present invention allows any operating point to be specified as a boundary point. For example, in resource utilization graphical representation 706, one operating range for the resource has moved to minimum constraint 712 at point 720. Additional boundaries have been specified at points 730, 732, and 728 along resource utilization graphical representation 706.

The boundary points along graphical representations 704 and 706 may be chosen in a variety of ways. According to one embodiment of the present invention the boundary points along resource utilization graphical representations 704 and 706 are chosen as those within a specified standard deviation of target 714. For example, boundary points 722 and 726 along graphical representation 704 may indicate a 50% deviation from target point 724. Points 718 and 728 may indicate a 80% standard deviation from target point 724. In another embodiment, the boundary points along resource utilization graphical representation 706 may be a standard deviation of the total distance between, for example, minimum point target point 724 as well as between maximum point 728 and target point 724. For example, boundary point 720 in resource utilization graphical representation 706 represents a standard deviation of 100% between minimum constraint 712 and target 714. Likewise, boundary point 728 represents a standard deviation of 100% between maximum constraint 716 and target 714. Boundary points 730 and 732 in resource utilization graphical representation 706 represent a 50% deviation from target point 724.

Figure 8:
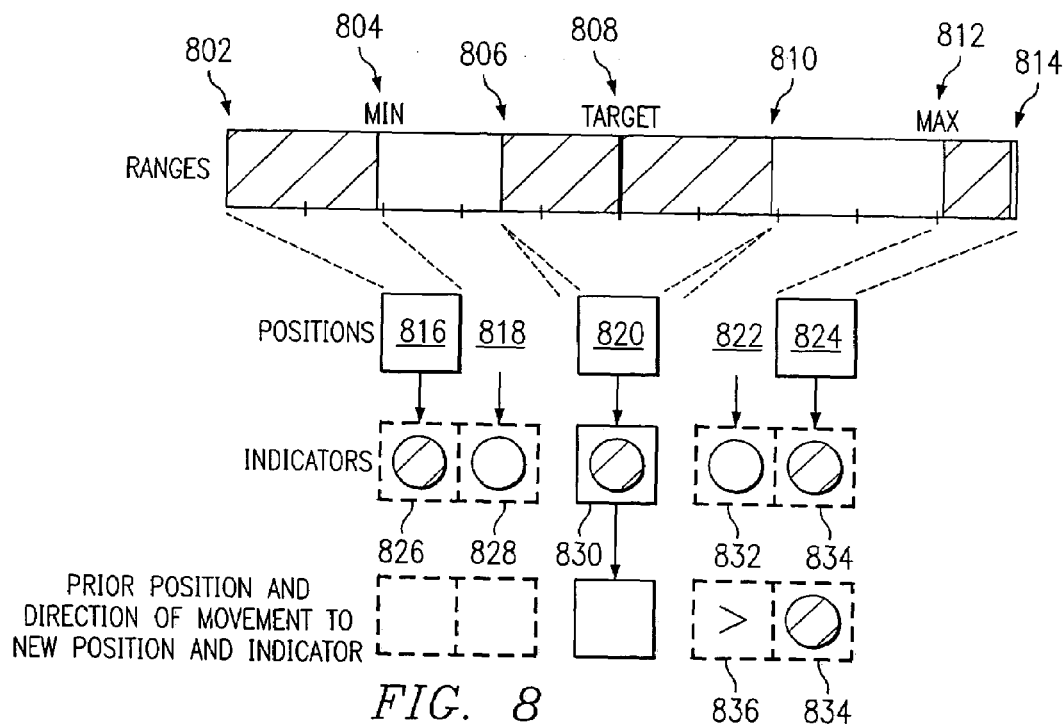
FIG. 8 is an exemplary illustration of mapping snap shot deviation options to graphical view elements in accordance with the present invention.

FIG. 8 is an exemplary illustration of mapping snap shot deviation options to graphical view elements in accordance with the present invention. In this example, areas between the boundary points described in FIG. 7 are mapped. This mapping may indicate at what range a resource is operating on the system. For example, as in FIG. 7 points 802 and 814 represent the total operating range of the resource on the system. In addition, operating boundaries are specified at points 804, 806, 810 and 812, with point 808 being the target operating point for the resource. The target or nominal position may be in the center, the direction of increasing deviation over nominal may be to the right, and the direction of increasing deviation under nominal may be to the left. Furthermore, those of ordinary skill in the art will appreciate that the over nominal and under nominal deviation direction may be reversed.

When the resource is operating in any of the areas between boundary points 802 and 804, 804 and 806, 806 and 810, 810 and 812, or 812 and 814, an indication is displayed in the related position indicating the current operating condition of the resource. The indication may be a color indication or a shade between black and white. For example, indicator 826 in position 816 reflects that the resource is operating within the range between 802 and 804. Referring to FIG. 8, the following table shows the relationship between operating range and related indicator position.

| Operating Range | Related Indicator Position |
| --- | --- |
| 802–804 | 816 |
| 804–806 | 818 |
| 806–810 | 820 |
| 810–812 | 822 |
| 812–814 | 824 |

Similarly, if the resource is operating within the range between boundary points 804 and 806 an indication in position 818 may be displayed as indicator 828. Similarly, indicators 830, 832, and 834 would be associated with the operating range related to positions 820, 822 and 824 respectively.

Additionally as shown in FIG. 8, an indication may also be displayed with indicator 836 showing the prior sampling period indicator location and by its direction, communicating the direction of movement resulting in the current operating resource condition indicator 834. This indicator behavior would be caused, for example, if the resource was operating in the range between boundary points 810 and 812 and due to a demand on the resource, the operating range increased into the range between boundary points 812 and 814, tracking indicator 836 may be displayed showing the previous demand usage position and the direction of movement to the current 834 position reflecting higher demand increase on the resource. In this example, tracking indicator 836 occupies the position reported in the prior data sampling time period and the point on the indicator shows that the demand on the resource has increased to the right. Tracking indicator may alternatively, indicate, if such is the case, that the demand on the resource has decreased, for example, if the operating condition of the resource has gone from the area between boundary points 806 and 810 to the area between boundary points 804 and 806.

Figure 9:
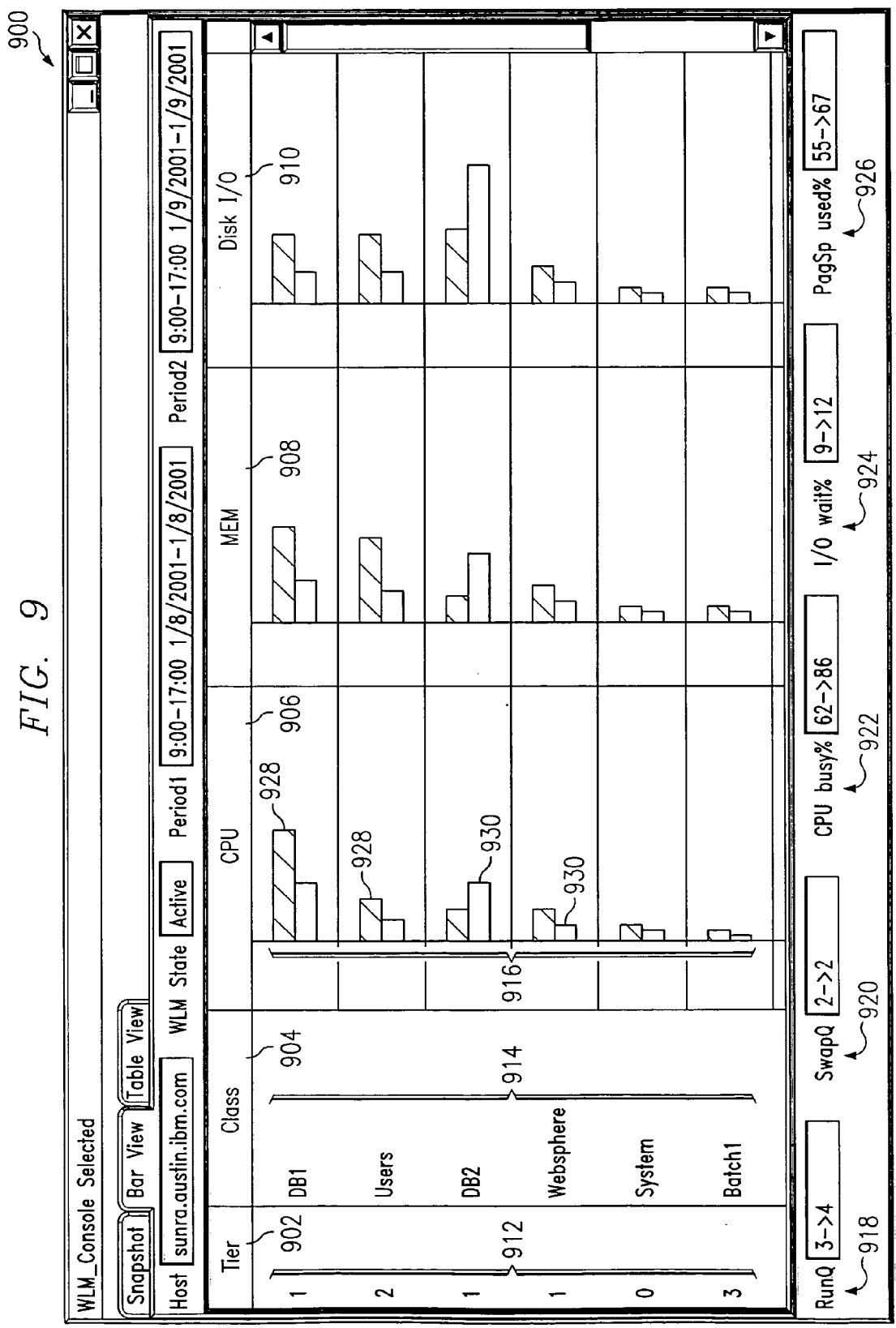
FIG. 9 is a graphical user interface (GUI) for indicating the utilization trending of a resource in accordance with the present invention.

FIG. 9 is a graphical user interface (GUI) for indicating the utilization trending of a resource in accordance with the present invention. FIG. 9 is an example of a UNIX system. Several displays may be provided by the present invention to display resource utilization information, such as, for example, the operating condition of a resource. The operating condition of the resource may be updated periodically based on a predetermined time period and this periodic update may be monitored and displayed on the graphical user interface. The operating conditions of a plurality of resources may be shown on either separate graphical user interfaces or combined on one graphical user interface. The operating condition of a resource may be displayed in a dynamic manner so as to provide an indication of utilization of the resource.

A table may be built, providing an array bounded by class names, and resources available to be managed in the WLM environment. For each class/resource cell, an individual snap shot, as illustrated in FIG. 7, may be provided. The snap shot may represent one linear time period or may compare two or more time periods within the same cell. Using the snap shot table, users may quickly be able to determine if resource allocations are out of tolerance and which classes or tiers are over utilizing or under utilizing specific resources. Corrective action may be taken if utilization of a resource or resources is not within acceptable parameters and made to adjust share distributions to optimize WLM allocations.

In this example, graphical user interface 900 contains tier 902, class 904, CPU (central processing unit) 906, MEM (memory) 908 and disk I/O (disk input/output) 910. Tier 902 and class 904 may be similar to those described in FIG. 4. In this example, resource classes 904 are shown as well as their associated tiers 902. For each class within resource class 904, CPU 906, MEM 908 and disk I/O 910 is shown. Within each of CPU 906, MEM 908 and disk I/O 910 may be shown a recent past and current operating condition for a resource.

Resource utilization trend view 900 may display bars 916 indicating resource utilization for each class. For example, bars 928 within CPU 906 indicate the current allocation of CPU 906 for elements within class 914. Bars 930 indicate the most recent past allocation of CPU 906 for elements within class 914. In addition, numerical values may be included in resource utilization trend view 900 which indicates the numeric values for both the current allocation of a resource and the most recent past allocation of a resource for elements within class 914.

In addition, resource utilization trend view 900 may also indicate in RunQ 918 a number of tasks in an execution space. Run Q 918 may, for example, indicate how crowded a processor work capacity is currently experiencing. In addition resource utilization trend view 900 may indicate in SwapQ 920 the number of tasks experiencing the overhead of swapping from real memory to virtual memory. CPU busy percentage 922 which may indicate the total processing space presently being used by CPU 906, I/O wait percentage 924 may indicate the traffic from disk to memory and Pag Sp Used percentage 926 may indicate disk/memory swap resources.

Figure 10:
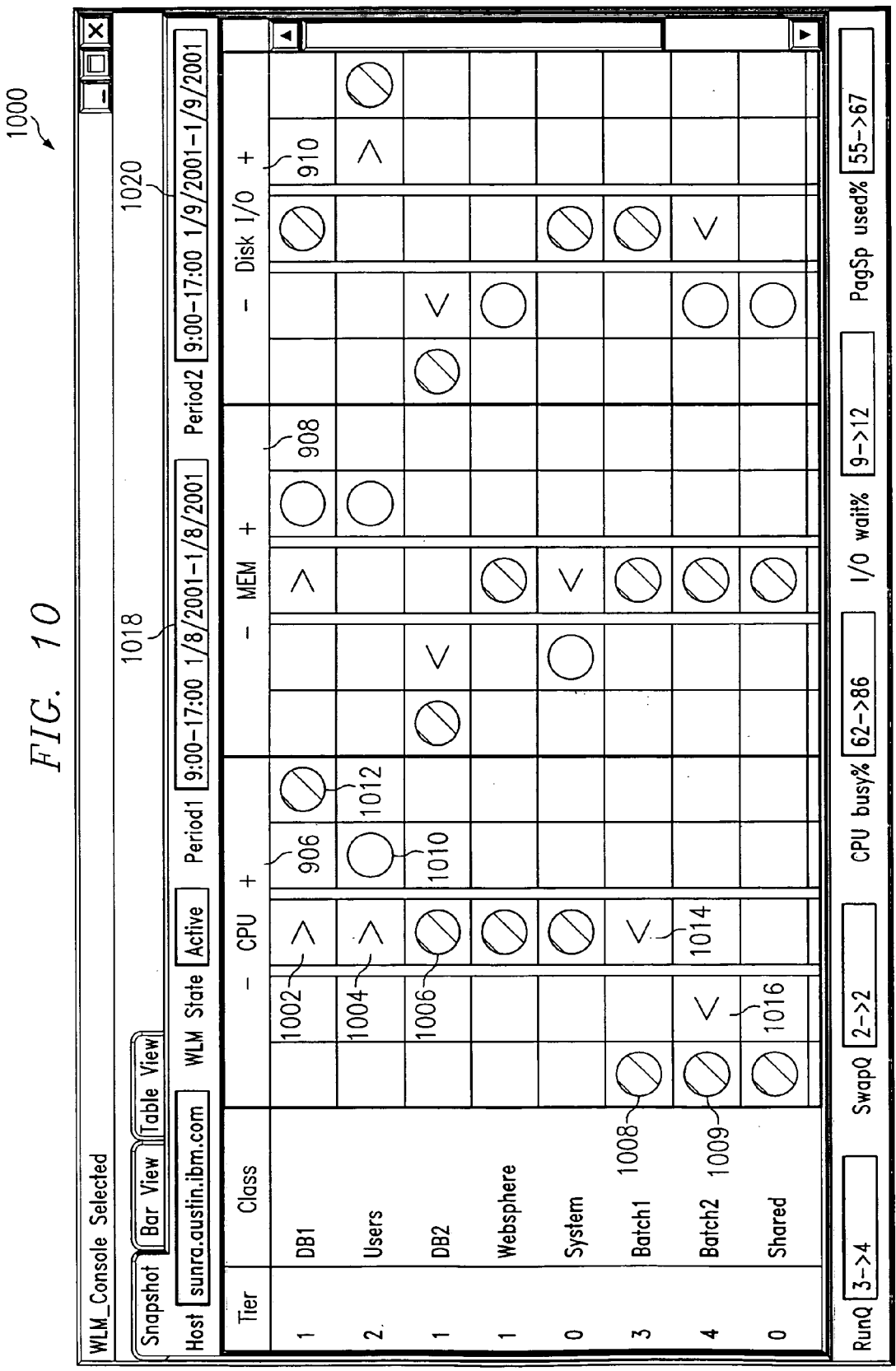
FIG. 10 is a graphical user interface (GUI) illustrating a combination status and trend snapshot view in accordance with the present invention.

FIG. 10 is a graphical user interface (GUI) illustrating a combination status and trend snapshot view in accordance with the present invention. The nominal position may be in the center, the direction of increasing deviation over nominal may be to the right, and the direction of increasing deviation under nominal may be to the left. Furthermore, those of ordinary skill in the art will appreciate that the over nominal and under nominal deviation direction may be reversed.

A trend snapshot view may indicate a nominal target utilization value for a resource. Additionally, a trend snapshot view may indicate a deviation from a target utilization for a resource and may also indicate over utilization and under utilization of a resource. If a range for resource utilization falls inside a user specified percentage of the target resource utilization, this may be illustrated by a specific color. If a range for resource utilization falls outside a user specified percentage of the target resource utilization, this may be further illustrated by another specified color. For example, below the user specified percentage of the target resource utilization may be illustrated by a blue indicator and above the user specified percentage of the target resource allocation may be illustrated by a red indicator. However, the resource utilization may also be shown in black and white with varying degrees of resource utilization within a range shown in varying shades of black.

In this example, resources CPU 906, MEM 908 and disk I/O 910 are displayed within trend snapshot view 1000. Center column 1002 of, for example, CPU 906 may indicate the nominal target utilization value of CPU 906. For example, if CPU is currently being utilized in a range between boundary points 806 and 810 in FIG. 8, an indicator may be placed in center column 1002 to indicate this target utilization of CPU 906. Indicator 1006 shows that CPU 906 is being utilized within a target range for a class. In addition, center column 1002 may also indicate the usage trend direction of a resource. For example, indicator 1004 indicates that from the most recent utilization of CPU 906 by a class to the current utilization by a class has increased from target utilization as indicated by indicator 1004 to a current utilization above the target utilization as indicated by indicator 1010. Similarly, indicator 1012 shows the current utilization of CPU 906 for a class, which, in this example, is on an upper limit of utilization. Indicators 1014 and 1016 indicate the utilization of CPU 906 has decreased since the most recent utilization to the ranges as shown by indicators 1008 and 1009, respectively. In addition time period 1018 and time period 1020 are the time periods which define an analysis period of analyzing data associated with utilization of a resource.

Figure 11:
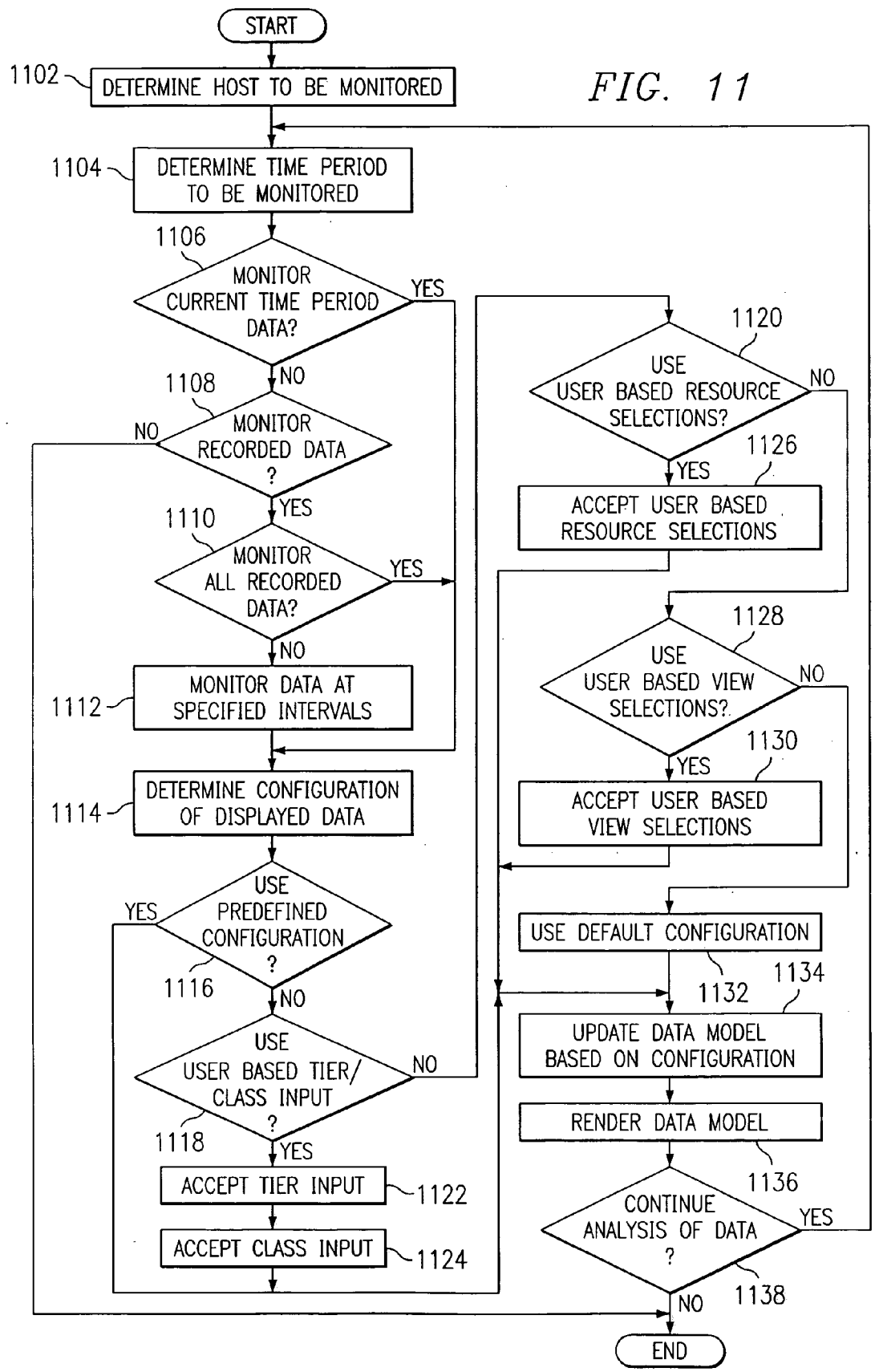
FIG. 11 is a flowchart illustrating visualization of system resource utilization in accordance with the present invention.

FIG. 11 is a flowchart illustrating visualization of system resource utilization in accordance with the present invention. In this example, the operation starts by determining a host to be monitored (step 1102). Then a time period for which the host is monitored is determined (step 1104). Then a determination is made as to whether or not a current time period is to be monitored (step 1106). If a current time period is not to be monitored (step 1106:NO), then a determination is made as to whether or not recorded data is to be monitored (step 1108). If recorded data is not to be monitored (step 1108:NO), the operation terminates. If recorded data is to be monitored (step 1108:YES), then a determination is made as to whether or not all recorded data is to be monitored (step 1110). If all recorded data is not to be monitored (step 1110:NO), data is monitored a specified intervals (step 1112).

Regardless of whether current time period data is to be monitored (step 1106:YES), all recorded data is to be monitored (step 1110:YES) or data a specified intervals is to be monitored (step 1112), the operation continues to determine a configuration of displayed data (step 1114). A determination is then made as to whether or not a predefined configuration is to be used (step 1116). If a predefined configuration is to be used (step 1116:YES), the operation continues to step 1132 in which data is updated based on the configuration. If a predefined configuration is not to be used (step 1116:NO), a determination is then made as to whether or not a user based tier/class input is to be used (step 1118). If a user based tier/class input is to be used (step 1118:YES), a tier input is accepted (step 1122) and a class input is accepted (step 1124) and the operation continues to step 1134 in which the data model is updated based on the configuration.

If user based tier/class input is not to be used (step 1118:NO), then a determination is made as to whether or not a user based resource selection is to be used (step 1120). If a user based user resource selection is not to be used (step 1120:NO), then a determination is made as to whether or not a user based view selection is to be used (step 1128). If a user based resource selection is to be used (step 1120:YES), the operation continues to step 1134 in which the data model is updated based on the configuration. If a user based view selection is not to be used (step 1128:NO), a default configuration is used. If a user based view selection is to be used (step 1128:YES), the operation continues to step 1134 in which the data model is updated based on the configuration.

The data model is then rendered (step 1136). Then a determination is made as to whether or not to continue analysis of the data (step 1138). If analysis of the data is to continue (step 1138:YES), the operation returns to step 1104 in which the time period in which to monitor the host is determined. If analysis of the data is not to continue (step 1138:NO), the operation terminates.

Figure 12:
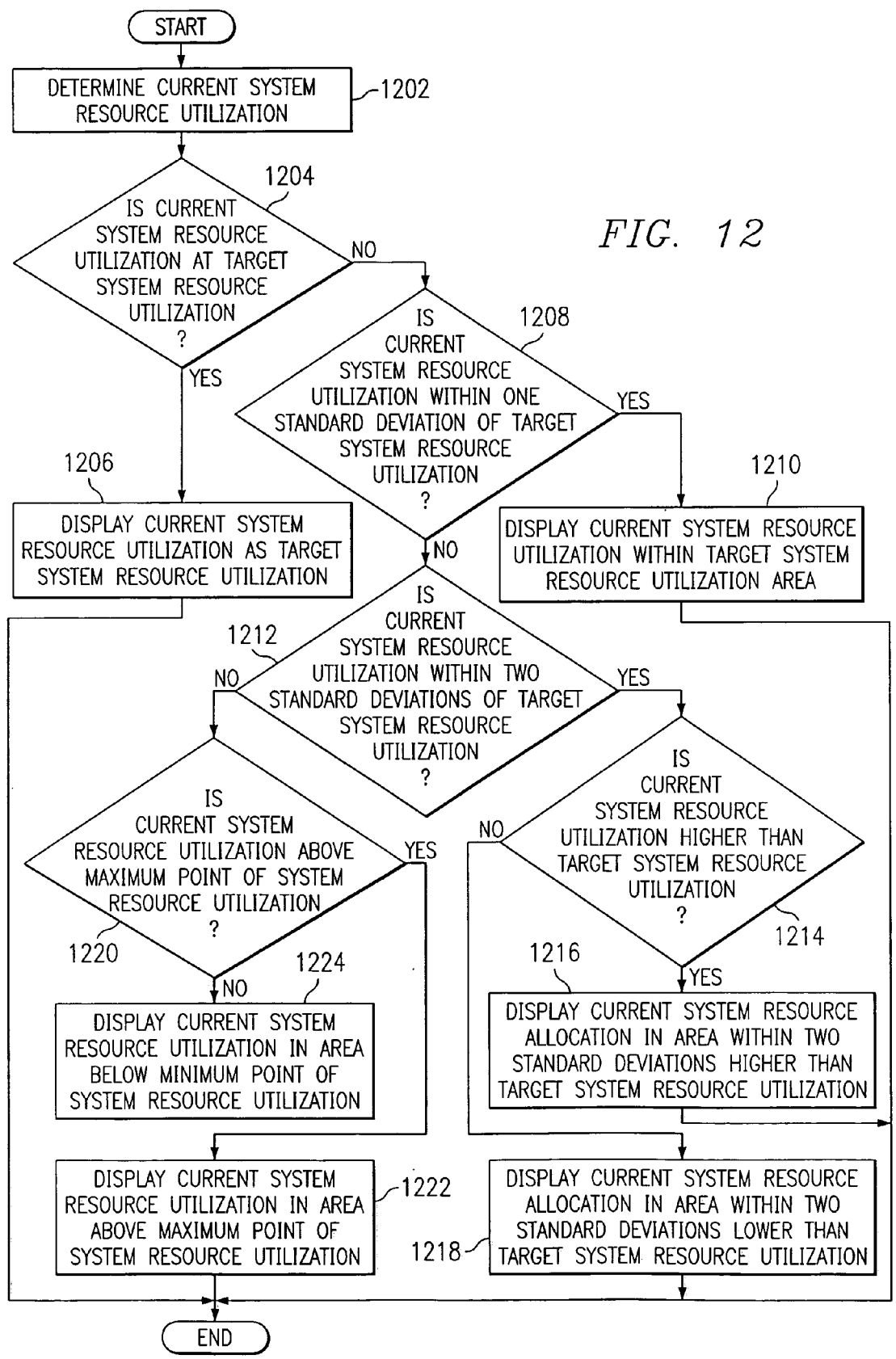
FIG. 12 is a flowchart illustrating specifying a range of system resource utilization in accordance with the present invention.

FIG. 12 is a flowchart illustrating specifying a range of system resource utilization in accordance with the present invention. While the example in FIG. 12 uses standard deviation to measure utilization of a system resource, other types of determining utilization of a system resource may be used within the spirit and scope of the present invention. For example, measurements of the utilization of a system resource may be manipulated by a variety of algorithms, such as, for example, averaging utilization of resources, providing an upper and lower bounded limit of utilization of resources, using unique industry or experience break points, and the like to define the displacement and display mechanism of the present invention.

In this example, the operation begins by determining a current resource utilization (step 1202). Then a determination is made as to whether or not the current system resource utilization is at a target system resource utilization (step 1204). If the current system resource utilization is at a target system resource utilization (step 1204:YES), then the current system resource utilization is displayed as the target system resource utilization (step 1206) and thereafter the operation terminates. If the current system resource utilization is not at a target system resource utilization (step 1204:NO), then a determination is made as to whether or not the current system resource utilization is within one standard deviation of the target system resource utilization (step 1208). If the current system resource utilization is within one standard deviation of the target system resource utilization (step 1208:YES), the current system resource utilization is displayed within the target system resource utilization area (step 1210) and thereafter the operation terminates.

If the current system resource utilization is not within one standard deviation of the target system resource utilization (step 1208:NO), then a determination is made as to whether or not the current system resource utilization is within two standard deviations of the target system resource utilization (step 1212). If the current system resource utilization is within two standard deviations of the target system resource utilization (step 1212:YES), then a determination is made as to whether or not the current system resource utilization is higher than the target system resource utilization (step 1214). If the current system resource utilization is higher than the target system resource utilization (step 1214:YES), the current system resource allocation is displayed in an area within two deviations higher than the target system resource utilization (step 1216) and thereafter the operation terminates. If the current system resource utilization is not higher than the target system resource utilization (step 1214:NO), the current system resource allocation is displayed in an area within two standard deviations lower than the target system resource utilization (step 1218) and thereafter the operation terminates.

Returning to step 1212, if the current system resource utilization is not within two standard deviations of the target system resource utilization (step 1212:NO), then a determination is made as to whether or not the current system resource utilization is above a maximum point of system resource utilization (step 1220). If the current system resource utilization is above a maximum point of system resource utilization (step 1220:YES), the current system resource utilization is displayed in an area above the maximum point of system resource utilization (step 1222) and thereafter the operation terminates. If the current system resource utilization is not above a maximum point of system resource utilization (step 1220:NO), the current system resource utilization is displayed in an area below a minimum point of system resource utilization (step 1224) and thereafter the operation terminates.

Therefore, the present invention provides a mechanism in which to report, monitor and optionally control the allocation of system resources. The present invention provides a method to visualize resources or other data activity with a graphic interface which will allow for immediate and knowledgeable control or understanding of resource activity behavior. The resource activity behavior may be sampled during a specified time period. A criterion may be selected which determines bounds by which the computing or other resources may be utilized. With the use of the present invention, a universally understood standard deviation is used as the basis for determining the bounds for the computing resources. A columnar GUI may be used to display monitored resource utilization information where target utilization is clearly indicated as well as less or more utilization than anticipated for each computing resource. Therefore, a user, such as a system administrator will be supplied with an up to date measure of the present utilization of each system resource. Also, an indication of the most recent past utilization of the system resource may be provided. This information may be shown by simple position of entries which may be reinforced by different colors and an indication of the degree of difference between assigned target and actual resource utilization under current workload conditions.

It is important to note that while the present invention has been described in the context of a fully functioning data processing system, those of ordinary skill in the art will appreciate that the processes of the present invention are capable of being distributed in the form of computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links. Furthermore, those of ordinary skill in the art will appreciate that the processes of the present invention are capable of being presented in rows of lights, visual displays, and printed reports.

The description of the present invention has been presented for purposes of illustration and description, but is not intended to be exhaustive or limited to the invention in the form disclosed. Many modifications and variations will be apparent to those of ordinary skill in the art. Although the depicted examples deals with a data processing resource, the present invention can be applied to other types of resources. The resource could be any type of resource that is partitioned into pools each of which is further subdivided. Another example might be software for managing an employee's 401K plan—where the total resource is the total amount of funds that can be contributed each pay period for an employee. The total of the indicators is the total contribution each month, each indicator may represents a different investment fund allocation in the 401K plan. Indicators are then subdivided into the employee contribution to each fund, and a matching contribution from the employer. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for displaying resource utilization information for a plurality of resources in a data processing system, comprising the steps of:

classifying each of a plurality of application processes operating on the data processing system into one of a plurality of application process classifications, wherein each application process classification is defined by a classification rule using at least one of attributes identifying a user that submitted one or more of the application processes, a group that submitted one or more of the application processes and a fully qualified path of one or more of the application processes; and for each application process classification, performing the following steps:

determining a time period in which to measure the resource utilization information;

monitoring the resource utilization information based on the time period; and displaying a result of the monitoring of the resource utilization information, wherein the result of the monitoring of the resource utilization information is dynamically displayed so as to provide an indication of utilization of a resource within the plurality of resources relative to a reference resource entitlement level.

2. The method as recited in claim 1, wherein the resource utilization information is used to determine a percentage of system resources utilized based on the time period relative to other resources in the same time period.

3. The method as recited in claim 1, wherein displaying the result of the resource utilization information is displayed in a utilization range.

4. The method as recited in claim 3, wherein the utilization range is defined by a standard deviation between the utilization of the resource and a target utilization for the resource.

5. The method as recited in claim 4, wherein the standard deviation is at least one of a deviation within a predetermined percentage of the target utilization and a deviation within a predetermined distance from the target utilization.

6. The method as recited in claim 1, wherein displaying the result of the monitoring of the resource utilization information is displayed in a graphical user interface.

7. The method as recited in claim 1, wherein the display of the result of the monitoring of the resource utilization information is displayed with an indicator, wherein the position of indicator Indicates a current utilization of the resource.

8. The method as recited in claim 7, wherein the current utilization of the resource is a range of current utilization of the resource.

9. The method as recited in claim 8, wherein the indicator is placed within the range of current utilization of a resource.

10. The method as recited in claim 7, wherein the indicator indicates a direction of current utilization of the resource.

11. The method as recited in claim 10, wherein the direction of current utilization of a resource includes an increasing utilization and a decreasing utilization.

12. The method of claim 1, wherein the result of the monitoring of the resource utilization information is a monitoring of a first utilization of the resource and further comprising:

monitoring a second utilization of the resource, wherein the second utilization of the resource occurs at later point in time of the first utilization of the resource; and displaying results of the second utilization of the resource.

13. The method as recited in claim 12, wherein the first utilization of the resource and the second utilization of the resource are displayed in a comparative manner.

14. The method as recited in claim 1, wherein displaying a result of the monitoring of the resource utilization information is displayed in a plurality of colors.

15. The method as recited in claim 14, wherein the plurality of colors includes a first color and a second color.

16. The method as recited in claim 15, wherein the first color is black and the second color is white.

17. A system, comprising:

a bus system;

a memory, including a set of instructions, connected to the bus system;

an output unit connected to the bus system; and a processing unit connected to the bus system, wherein the processing unit classifies each of a plurality of application processes operating on a data processing system into one of a plurality of application process classifications, wherein each application process classification is defined by a classification rule using at least one of attributes identifying a user that submitted one or more of the application processes, a group tat submitted one or more of to application processes and a fully qualified path of one or more of the application processes and, for each application process classification, the processing unit:

executes the set of instructions from the memory to determine a time period in which to measure resource utilization information; monitors the resource utilization information based on the time period; and instructs the output unit to display a result of the monitoring of the resource utilization information, wherein the result of the monitoring of the resource utilization information is dynamically displayed so as to provide an indication of utilization of a resource within the plurality of resources relative to a reference resource entitlement level.

18. A data processing system for displaying resource utilization information for a plurality of resources, comprising:

classifying means for classifying each of a plurality of application processes operating on a data processing system into one of a plurality of application process classifications, wherein each application process classification is defined by a classification rule using at least one of attributes identifying a user that submitted one or more of the application processes, a group that submitted one or more of the application processes and a fully qualified path of one or more of the application processes; and executing means for executing for each application process classification:

determining means for determining a time period in which to measure the resource utilization information;

monitoring means for monitoring the resource utilization information based on the time period; and displaying means for displaying a result of the monitoring of the resource utilization information, wherein the result of the monitoring of the resource utilization information is dynamically displayed so as to provide an indication of utilization of a resource within the plurality of resources relative to a reference resource entitlement level.

19. The data processing system as recited in claim 18, wherein the resource utilization information is used to determine a percentage of system resources utilized based on the time period relative to other resources in the saint time period.

20. The data processing system as recited in claim 18, wherein displaying the result of the resource utilization information is displayed in a utilization range.

21. The data processing system as recited in claim 20, wherein the utilization range is defined by a standard deviation between the utilization of the resource and a target utilization for the resource.

22. The data processing system as recited in claim 21, wherein the standard deviation is at least one of a deviation within a predetermined percentage of the target utilization and a deviation within a predetermined distance from the target utilization.

23. The data processing system as recited in claim 18, wherein displaying the result of the monitoring of the resource utilization information is displayed in a graphical user interface.

24. The data processing system as recited in claim 18, wherein the display of the result of the monitoring of the resource utilization information is displayed with an indicator, wherein the indicator indicates a current utilization of the resource.

25. The data processing system as recited in claim 24, wherein the current utilization of the resource is a range of current utilization of the resource.

26. The data processing system as recited in claim 25, wherein the indicator is placed within the range of current utilization of a resource.

27. The data processing system as recited in claim 24, wherein the indicator indicates a direction of current utilization of the resource.

28. The data processing system as recited in claim 27, wherein the direction of current utilization of a resource includes an increasing utilization and a decreasing utilization.

29. The data processing system as recited in claim 18, wherein the result of the monitoring of the resource utilization information is a monitoring of a first utilization of the resource and further comprising:

monitoring means for monitoring a second utilization of the resource, wherein the second utilization of the resource occurs at later point in time of the first utilization of the resource; and displaying means for displaying results of the second utilization of the resource.

30. The data processing system as recited in claim 29, wherein the first utilization of the resource and the second utilization of the resource are displayed in a comparative manner.

31. The data processing system as recited in claim 18, wherein displaying a result of the monitoring of the resource utilization information is displayed in a plurality of colors.

32. The data processing system as recited in claim 31, wherein the plurality of colors includes a firm color and a second color.

33. The data processing system as recited in claim 32, wherein the first color is black and to second color is white.

34. A computer program product in a computer-readable medium for displaying resource utilization information for a plurality of resources, comprising:

instructions for classifying each of a plurality of application processes operating on a data processing system into one of a plurality of application process classifications, wherein each application process classification is defined by a classification rule using at least one of attributes identifying a user that submitted one or more of the application processes, a group that submitted one or more of the application processes and a fully qualified path of one or more of the application processes; and instructions for executing, for each application process classification:

instructions for determining a time period in which to measure the resource utilization information;

instructions for monitoring the resource utilization information based on the time period; and instructions for displaying a result of the monitoring of the resource utilization information, wherein the result of the monitoring of the resource utilization information is dynamically displayed so as to provide an indication of utilization of a resource within the plurality of resources relative to a reference resource entitlement level.

35. The computer program product as recited in claim 34, wherein the result of the monitoring of the resource utilization information is a monitoring of a first utilization of the resource and further comprising:

instructions for monitoring a second utilization of the resource, wherein the second utilization of the resource occurs at later point in time of the first utilization of the resource; and instructions for displaying results of the second utilization of the resource.

36. The method as recited in claim 1, further comprising:

for each application process classification, assigning a respective share value for each application process classification of the plurality of application process classification, wherein the share value of a first application process classification receives more resource time than the share value of a second application process classification; and determining a percentage of resource time for each application process classification in response to the respective share value.

37. The method as recited in claim 1, wherein the classification rule identifies which attributes and values of those attributes that are to be included in a particular class.

38. The method as recited in claim 1, wherein the resource utilization information is information pertaining to allocation of resources consumed within the data processing system.

39. The data processing system as recited in claim 18, further comprising:
- for each application process classification, assigning means for assigning a respective share value for each application process classification of the plurality of application process classification, wherein the share value of a first application process classification receives more resource time than the share value of a second application process classification; and
- determining means for determining a percentage of resource time for each application process classification in response to the respective share value.

40. The data processing system as recited in claim 18, wherein the classification rule identifies which attributes and values of those attributes that are to be included in a particular class.

41. The data processing system as recited in claim 18, wherein the resource utilization information is information pertaining to allocation of resources consumed within the data processing system.

42. The computer program product as recited in claim 34, further comprising:
- for each application process classification, instructions for assigning a respective share value for each application process classification of the plurality of application process classification, wherein the share value of a first application process classification receives more resource time than the share value of a second application process classification; and
- instructions for determining a percentage of resource time for each application process classification in response to the respective share value.

* * * * *